UNITED STATES PATENT OFFICE.

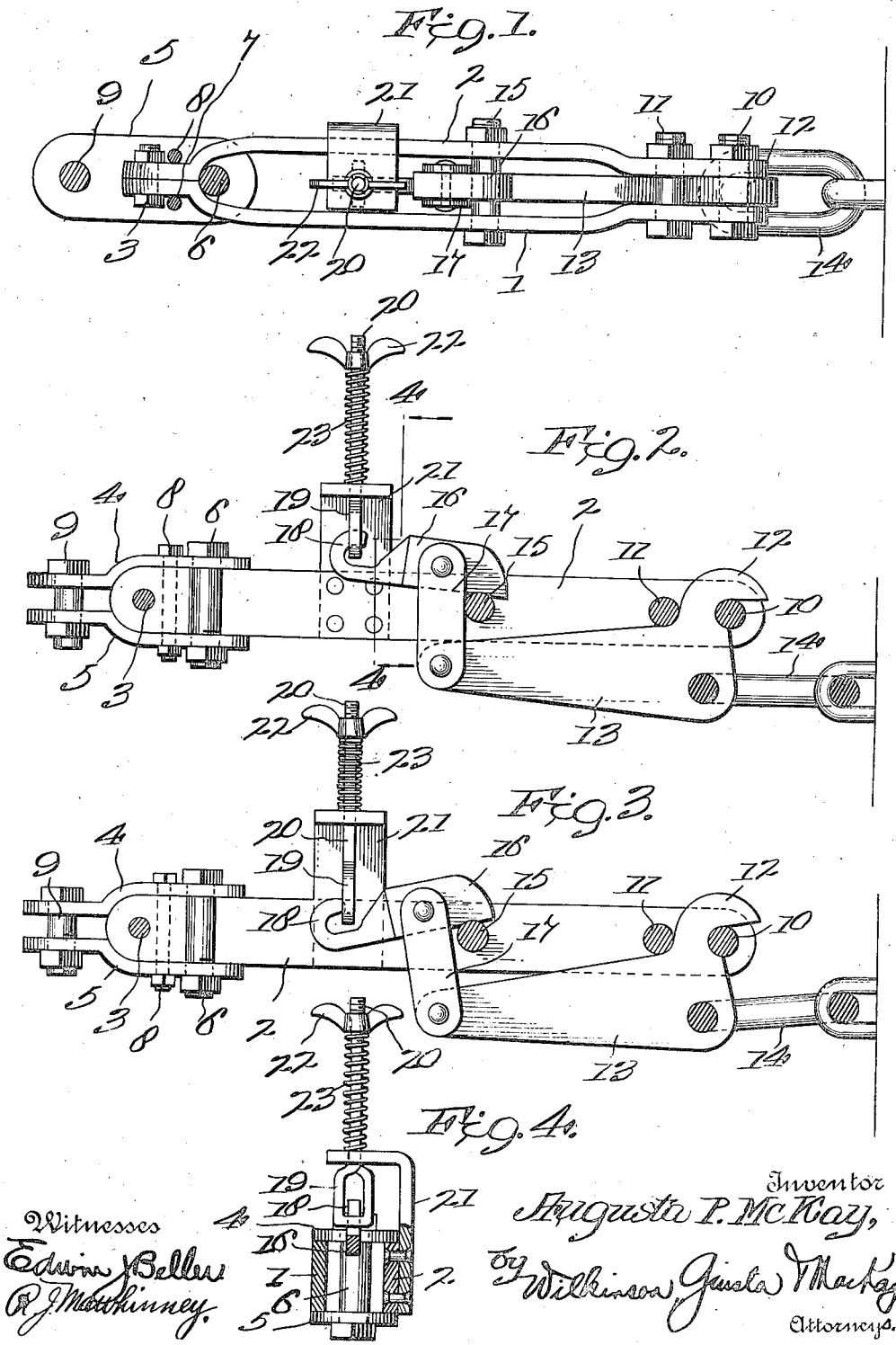

AUGUSTA P. McKAY, OF ROME, GEORGIA, ASSIGNOR TO McKAY DISC PLOW CO., OF ROME, GEORGIA, A CORPORATION OF GEORGIA.

DRAFT APPLIANCE.

1,176,580.  Specification of Letters Patent.  Patented Mar. 21, 1916.

Application filed July 7, 1915. Serial No. 38,494.

*To all whom it may concern:*

Be it known that I, AUGUSTA P. McKAY, a citizen of the United States, residing at Rome, in the county of Floyd and State of Georgia, have invented certain new and useful Improvements in Draft Appliances; and I do hereby declare the following to be a full, clear, and exact description of the invention, such as will enable others skilled in the art to which it appertains to make and use the same.

The present invention relates to improvements in draft appliances, and consists more particularly in an improved draft appliance designed especially for use in coupling plows, harvesters, or other implements to traction vehicles, although it will be understood that the invention is not limited to such use but may be employed in other connections.

It is an object of the present invention to provide an improved draft appliance which will normally form a rigid coupling between the traction vehicle and implement, but which will be automatically released to uncouple the same when the implement encounters an obstruction of such a character as to result in the breakage of parts.

A further object of the present invention resides in providing an improved draft appliance of the above character which will be simple in construction, readily coupled between the implement and traction engine, and which can be regulated to release when subjected to strain of a predetermined amount.

With these and other objects in view the invention consists in the novel details of construction and combinations of parts more fully hereinafter disclosed and particularly pointed out in the claims.

In the accompanying drawings forming a part of this application, and in which similar reference symbols indicate corresponding parts in the several views: Figure 1 is a top plan view, partly in section, of an improved draft appliance constructed in accordance with the present invention. Fig. 2 is a side elevational view of the same, partly in section, and with one member of the frame removed. Fig. 3 is a similar view illustrating the parts in partially released position when subjected to strain; and Fig. 4 is a cross sectional view on the line 4—4 in Fig. 2 and looking in the direction of the arrows.

Referring more particularly to the drawings, 1 and 2 designate a pair of members constituting the frame of the improved draft appliance, and being connected at their rear ends by a bolt 3. A pair of plates 4 and 5 are clamped over the rear ends of the members 1 and 2 and are connected together by a bolt 6, disposed between said members, and by bolts 7 and 8 embracing the sides of the same. A bolt 9 is mounted between the outer ends of the members 4 and 5 for connection to a clevis or other device on a plow, harvester or the like implement to be drawn.

The forward ends of the frame members 1 and 2 are connected in spaced relation by a pair of bolts 10 and 11, arranged to receive a hook or bill 12 on a coupling element 13. The coupling element 13 is advantageously of the general configuration more particularly illustrated in Figs. 2 and 3, and is arranged to be coupled at its forward end by a chain or other connection 14, through which the draft is exerted from the traction vehicle.

In the frame members 1 and 2, to the rear of the bolts 10 and 11, is provided a fulcrum 15 for loose engagement by the forward end of a lever 16 connected by links 17 to the rear end of the coupling element 13. At its rear end the lever 16 is shaped to provide a hook 18, normally in engagement with an eye 19 bent from a rod 20 mounted to reciprocate vertically in a support 21. The rod 20 is threaded at its upper end, as clearly shown in the drawings, to receive an adjusting nut 22, between which latter and the support 21 is confined a coil spring 23 normally maintaining said rod in the elevated position disclosed in Fig. 2.

In the operation of the improved draft appliance, the parts are normally in the position as indicated in Fig. 2, the frame being connected through the pin 9 to the implement and the coupling element 13 coupled to the traction vehicle by the chain 14. In such position the improved appliance forms a rigid connection between the traction vehicle and implement, and may be readily coupled and uncoupled through the pin 9. In the event of the implement encountering an obstruction, such as a stump, rock, or the like, the strain exerted through the chain 14 on the coupling element 13, and normally acting to revolve said coupling element about the bolt 10 as a center, will, through the links 17, draw the lever 16 about the fulcrum 15 from the position shown in Fig. 2 to that shown in Fig. 3. This movement operates to compress the spring 23 and, provided the strain is greater than the tension for which the spring is set, the lever 16 may be drawn down sufficiently far to permit the hook 18 to disengage the eye 19 on the rod 20. When such disengagement is effected the lever 16, links 17 and coupling element 13 will drop by gravity, assisted by the pull on chain 14, and will revolve said coupling element 13 around the center 10 until the hook 12 disengages the same, when the associated parts will be entirely released from connection with the drawn implement.

It will be understood that the spring 23 may be subjected to any desired tension whereby the amount of strain required to operate the releasable parts may be regulated. The bill 12 on the coupling element 13 may be readily reëngaged with the bolts 10 and 11, and the lever 16 restored to position pivoting on the fulcrum 15 and with its hook 18 re-inserted in the eye 19 of the rod 20, and the improved appliance will be found assembled for subsequent use.

It is obvious that those skilled in the art may vary the details of construction and arrangements of parts without departing from the spirit of my invention, and therefore I do not wish to be limited to such features except as may be required by the claims.

I claim:

1. In an improved draft appliance of the character described, the combination of a frame connected to one vehicle, a coupling element connected to the other vehicle and detachably mounted at one end thereof in said frame, means detachably connecting the other end of said coupling element in the frame, and yieldable means associated with said last-named means for normally maintaining the same in coupled position, substantially as described.

2. In an improved draft appliance of the character described, the combination of a frame connected to one vehicle, a coupling element connected to the other vehicle and detachably mounted at its forward end in said frame to swing to release therefrom, means detachably connecting the rear end of said coupling element in the frame, and detachable means permanently supported on said frame and detachably engaging said last-named means to maintain the coupling element in coupled position and normally preventing same from swinging about its forward end to become detached from said frame, substantially as described.

3. In an improved draft appliance of the character described, the combination of a frame adapted for connection to one vehicle, a coupling element mounted for release in said frame and having one end detachably engaging therein, means connecting said coupling element to the other vehicle and tending to detach the same from said frame, a lever detachably fulcrumed in said frame, means connecting said lever and the other end of said coupling element for holding the same against detachment from the frame, a movable rod on said frame, releasable connections between said rod and lever, and yieldable means for maintaining said rod in position to engage said lever, substantially as described.

4. In an improved draft appliance of the character described, the combination of a frame adapted for connection to the drawn implement, a coupling element mounted for release in said frame and connected to the traction vehicle, a lever detachably fulcrumed in said frame, means connecting said lever and coupling element, a movable rod on said frame, releasable connections between said rod and lever, yieldable means for maintaining said rod in position to engage said lever, and means for adjusting the tension of said yieldable means, substantially as described.

5. In an improved draft appliance, the combination of a frame coupled to one vehicle, a coupling element detachably fitted in said frame and mounted to swing to disengage the same, a connection between the other vehicle and said coupling element for exerting a tendency to revolve and detach the latter, a fulcrum in said frame, a lever detachably pivoting on said fulcrum, link connections between said lever and coupling element, a hook on said lever, and yieldable means detachably engaging the hook on said lever for normally holding the coupling element in coupled position in opposition to the draft on said connection, substantially as described.

6. A draft appliance comprising a frame coupled to one vehicle, a socket in said frame, a coupling element, a bill on said coupling element detachably fitted in said socket, a connection between the other vehicle and said coupling element for tending to swing the latter to disengage the bill from said socket and detach said coupling element from the frame, a fulcrum in said frame, a lever detachably pivoting on said fulcrum, link connections between said lever and the rear end of said coupling element, an open hook on said lever, and yieldable means detachably engaging the open hook on said lever for normally maintaining the coupling element in coupled position against the influence of said connection, substantially as described.

7. A draft appliance including a frame composed of a pair of elongated members, means for securing said members together at their rear ends, means for coupling the rear end of said frame to one vehicle, a pair of spaced bolts for connecting the forward ends of said frame in spaced relation, a coupling element, a bill on the forward end of said coupling element detachably fitted between said bolts, a connection between the vehicle and said coupling element exerting a tendency to revolve the latter to disengage the bill from said bolts, means fitted in and detachable from said frame and connected to uphold the rear end of the coupling element, and yieldable means engaging said last-named means to normally maintain the parts in coupled position, substantially as described.

In testimony whereof, I affix my signature.

AUGUSTA P. McKAY.